United States Patent
Gandhi et al.

(10) Patent No.: US 9,396,639 B2
(45) Date of Patent: Jul. 19, 2016

(54) APPARATUS AND METHOD FOR MANAGING OPERATOR ALERTNESS AND ENHANCING OPERATOR EFFECTIVENESS FOR INDUSTRIAL CONTROL SYSTEMS

(71) Applicant: Honeywell International Inc., Morristown, NJ (US)

(72) Inventors: Amol Gandhi, Maharashtra (IN); Kishen Manjunath, Karnataka (IN); Rohan McAdam, Yetholme, NSW (AU)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/519,999

(22) Filed: Oct. 21, 2014

(65) Prior Publication Data

US 2016/0110983 A1     Apr. 21, 2016

(51) Int. Cl.
    *G08B 23/00*     (2006.01)
    *G08B 21/02*     (2006.01)

(52) U.S. Cl.
    CPC ........................... *G08B 21/02* (2013.01)

(58) Field of Classification Search
    None
    See application file for complete search history.

(56) References Cited

U.S. PATENT DOCUMENTS

| | | | | |
|---|---|---|---|---|
| 5,682,882 A | * | 11/1997 | Lieberman | G08B 21/06 600/301 |
| 6,661,345 B1 | * | 12/2003 | Bevan | G08B 21/06 340/575 |
| 2015/0258997 A1 | * | 9/2015 | Nilsson | B60W 40/09 340/576 |

FOREIGN PATENT DOCUMENTS

| | | |
|---|---|---|
| EP | 0680728 | 11/1995 |
| WO | WO 93/08739 | 5/1993 |
| WO | WO 2014/057308 | 4/2014 |

OTHER PUBLICATIONS

Extended European Search Report issued for EP 15190051.1 dated Mar. 30, 2016, 8 pgs.

* cited by examiner

*Primary Examiner* — Travis Hunnings

(57) ABSTRACT

A method includes receiving activity data from a plurality of sensors associated with at least a portion of an industrial process system. The method also includes monitoring the activity data to identify a period of inactivity of all of the plurality of sensors. The method also includes responsive to identifying the period of inactivity, issuing an alarm.

20 Claims, 5 Drawing Sheets

APPARATUS AND METHOD FOR MANAGING OPERATOR ALERTNESS AND ENHANCING OPERATOR EFFECTIVENESS FOR INDUSTRIAL CONTROL SYSTEMS

TECHNICAL FIELD

This disclosure relates generally to industrial control and automation systems. More specifically, this disclosure relates to an apparatus and method for managing operator alertness and enhancing operator effectiveness for industrial control systems.

BACKGROUND

Physical systems involve at least the transport of a tangible (i.e. real) product, while physical processes further involve the manufacture of a tangible product from one or more materials. The physical system may be a large geographically dispersed system (e.g., a gas pipeline) or complex multi-step process (e.g., for a large oil refinery). Physical systems may be contrasted with virtual systems which lack association with movement or processing of any tangible (i.e. real) materials.

The physical system, typically an industrial plant, may comprise a process automation system which refers to a monitoring and control system, running a set of industrial processes that generate a physical (tangible) product, in which a distributed control system (DCS) may utilize controller elements to monitor and control the industrial processes. Field operators are within the plant around the equipment (sometimes referred to as "assets") within the system. With regard to monitoring, sensors for the industrial processes generate process data (e.g., temperatures, pressures, and the like) that is transmitted to the DCS, often in real time. The DCS subsequently displays the process data for human operators generally referred to as "console operators" which monitor and control the industrial process via graphical user interfaces (GUIs) displayed in a console of a control room. The components of the process automation system may be connected by a process control communications network.

The control room of an industrial plant is a key area of plant operations where the continuous plant processes are monitored and controlled for safe and efficient plant operations. These facilities need to be operational round the clock, 24/7, 365 days a year. The control room and operator's console is the primary work environment for operators to maintain the safe and efficient operation of the plant.

SUMMARY

This disclosure provides an apparatus and method for providing a generalized continuous performance indicator.

In a first embodiment, a method is performed using at least one processing device. The method includes receiving activity data from a plurality of sensors associated with at least a portion of an industrial process system. The method also includes monitoring the activity data to identify a period of inactivity of all of the plurality of sensors. The method also includes responsive to identifying the period of inactivity, issuing a first alarm.

In a second embodiment, an apparatus includes at least one memory and at least one processing device. The at least one memory can store activity data from a plurality of sensors associated with at least a portion of an industrial process system. The at least one processing device can monitor the activity data to identify a period of inactivity of all of the plurality of sensors. The at least one processing device can also, responsive to identifying the period of inactivity, issue a first alarm.

In a third embodiment, a non-transitory computer readable medium embodies a computer program. The computer program includes computer readable program code for receiving activity data from a plurality of sensors associated with at least a portion of an industrial process system. The computer program also includes computer readable program code for monitoring the activity data to identify a period of inactivity of all of the plurality of sensors. The computer program also includes computer readable program code for, responsive to identifying the period of inactivity, issuing a first alarm.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
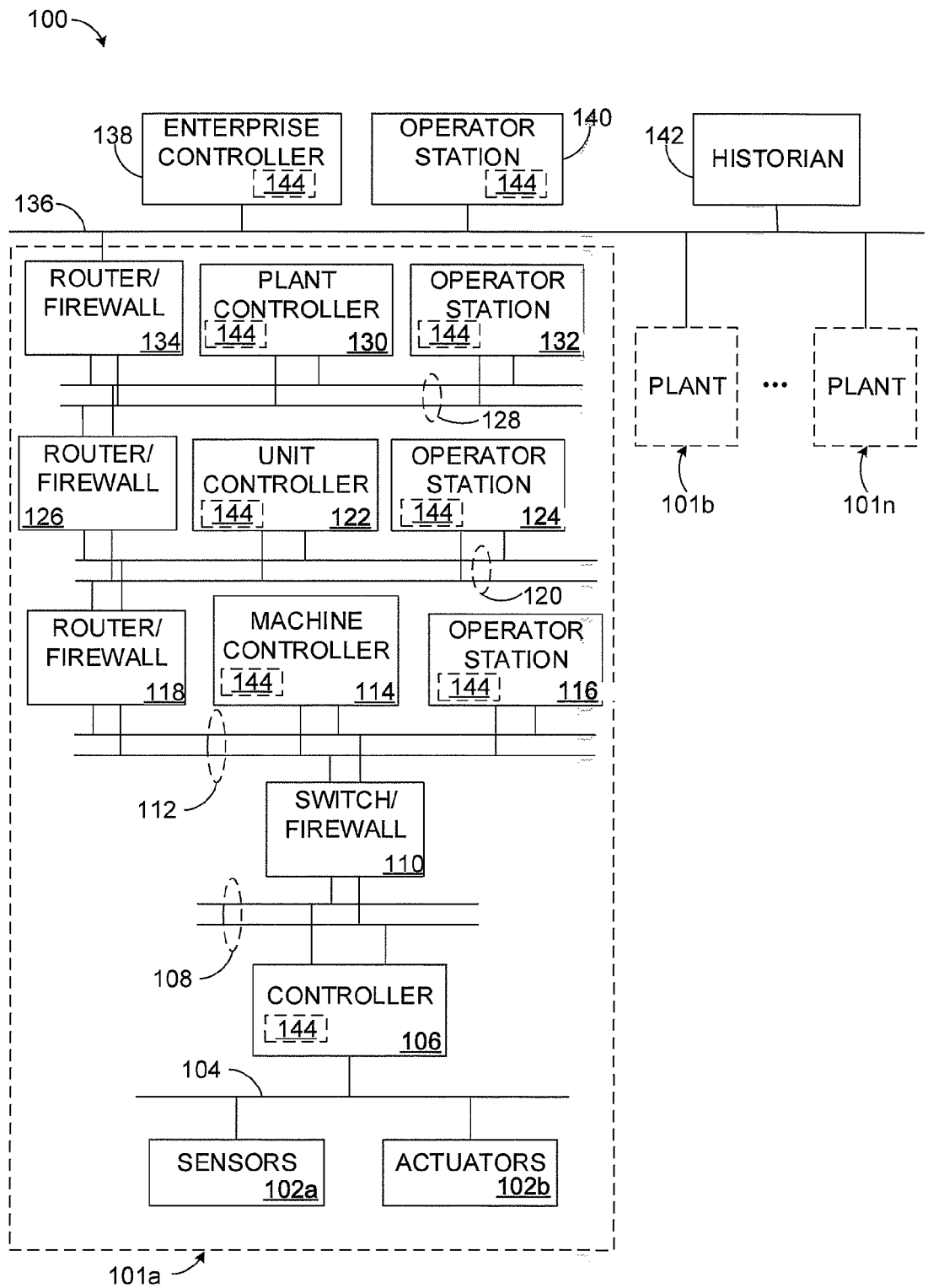
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, level or flow rate. The sensors 102a could also measure physiological attributes of an operator and produce physiological data. The physiological data could include, but not be limited to, brain activity data of the operator through an electroencephalography (EEG), posture data of the operator, eyelid data of the operator, and the like. The sensors 102a may also monitor activity of responding to an alarm, idle time, and operator activity. For example, sensors 102a may track when the operator is responding to alarms or alerts.

The actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 302b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent simple Proportional Integral Derivative (PID) controllers that are part of a distributed control system, a multivariable controller, or advanced controllers such as model predictive controllers. As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization, operator activity, alarms, alerts, operator responses to alarms and alerts, and the like. The historian 142 represents any suitable structure for storing and facilitating retrieval of information. Although shown as a single centralized component coupled to the network 136, the historian 142 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices; one or more memories for storing instructions and data used, generated, or collected by the processing device(s); and one or more interfaces for communicating with external devices or systems (such as one or more Ethernet interfaces).

As described above, conventional industrial facilities can include hundreds or thousands of control loops with their associated controllers. As a result, it is often difficult to determine which control loops are experiencing problems, especially when a problem in one control loop adversely affects other control loops. A generalized index can be used in control loop monitoring tools to provide a qualitative indication of an overall loop performance (such as Excellent, Fair, Poor, etc.) based on the values of various Key Performance Indicators (KPIs) (which may also be known as diagnostic indicators). Since this indication is qualitative, the nature of information given to an operator is only in certain discrete levels. Also, because of its qualitative nature, this generalized index cannot be rolled up to upper levels in a hierarchy, unlike the individual KPIs. A quantitative measure of overall loop performance is thus needed to address various issues.

Maintaining best in class plant operations and around the clock operator alertness are some of the key challenges of current industrial facilities. Operator fatigue is a major safety concern, which can result in errors, slowed responses, missed opportunities and incorrect responses to emergency situations which can lead to major incidents, such as accidents and the like. Even during normal operation, operators need to maintain situation awareness during periods of lull or boredom to ensure required attention is provided and appropriate actions are performed to ensure safe and efficient operations.

In accordance with this disclosure, at least one component of the system 100 implements or otherwise provides a detection system 144. For example, all or portions of the detection system 144 may be included with one or more of the controllers 106, 114, 122, 130, 138 and the operation stations 116, 124, 132, 140. The detection system 144 helps to detect fatigue and increase operator alertness. In some embodiments, the detection system 144 may provide monitoring system performance, activity data, and physiological data of the operator. For example, the detection system 144 may identify an alertness level of an operator based on the physiological data.

The detection system 144 can support various other features. For example, the detection system 144 may provide a mechanism to give a warning to concerned authorities about an alertness level of an operator. As another example, the detection system 144 may provide a mechanism to display predictive performance of alertness in the near future, thereby enabling the operator to take pre-emptive measures to avert further fatigue. As another example, the detection system 144 may provide alerts to an operator to warn the operator of fatigue.

For advance process control applications, where the process model can contribute significantly towards the performance of any loop, the detection system 144 can give an overall quality of the model. Embodiments of this disclosure for example can be used to combine existing model quality metrics (such as a model quality index/phase index) to derive a generalized model quality index. In addition, a progressive indication of the generalized model index can be helpful to a user in order to monitor the quality of a model over a period of time and enable pre-emptive action in case the model quality is degrading.

For alarm management applications, where the objective is to manage the alarms generated within a plant, the generalized indicator tool can provide a continuous status of overall alarm performance. A color gradient-based progressive indication of the plant's overall alarm performance enables pre-emptive actions in case of gradual degradation.

The detection system 144 can be implemented using any suitable hardware or combination of hardware and software/firmware. For example, the detection system 144 could be implemented using a software application that is executed by the processing device(s) of a controller or operator station.

Although FIG. 1 illustrates one example of an industrial process control and automation system 100, various changes may be made to FIG. 1. For example, a control system could include any number of sensors, actuators, controllers, servers, operator stations, networks, and generalized indicator tools. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, FIG. 1 illustrates an example environment in which a generalized indicator tool can be used. This functionality can be used in any other suitable device or system.

Figure 2:
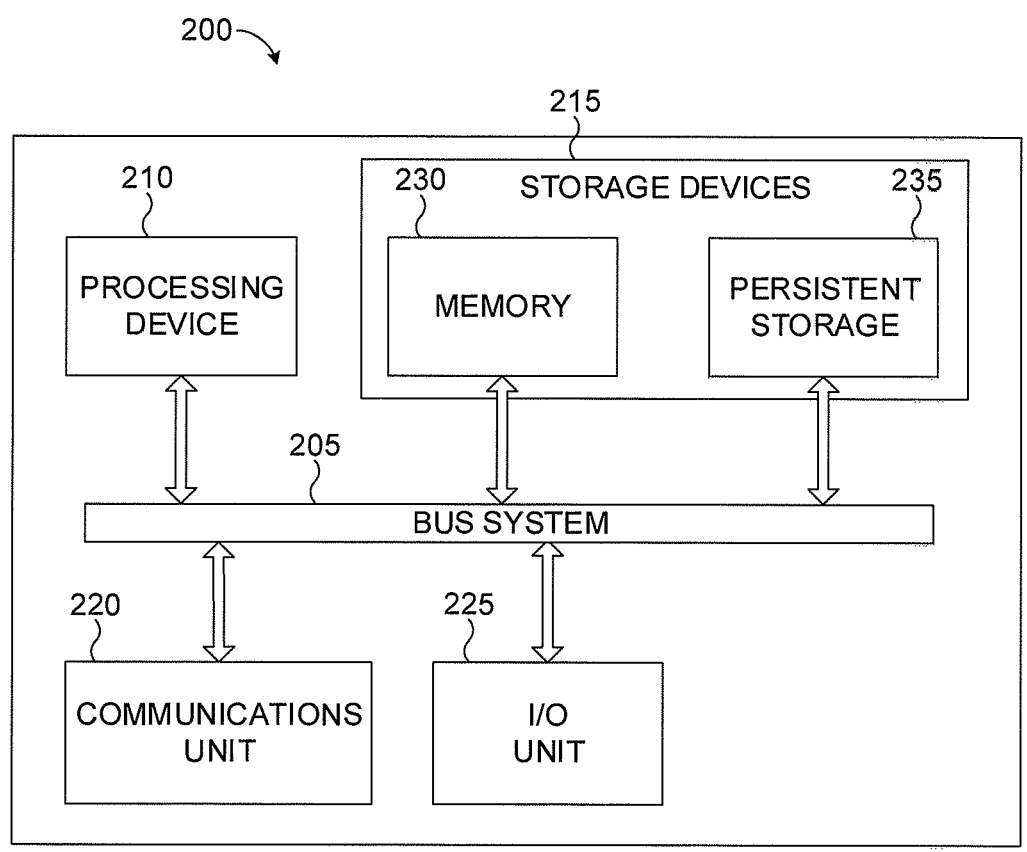
FIG. 2 illustrates an example device for implementing a detection system in an industrial control and automation system according to this disclosure.

FIG. 2 illustrates an example device 200 for implementing a detection system in an industrial control and automation system according to this disclosure. In particular, FIG. 2 illustrates an example computing device 200. The computing device 200 could, for example, represent all or part of a controller or operator station in FIG. 1.

As shown in FIG. 2, the computing device 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read only memory, hard drive, Flash memory, or optical disc.

The communications unit 220 supports communications with other systems or devices. For example, the communications unit 220 could include a network interface card or a wireless transceiver facilitating communications over a network. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the device 200 can be used to execute the detection system 144 in order to provide overall performance indicators as continuous quantitative values. For better visual interpretations, the continuous values can be associated with different colors. This can be done, for example, by associating various combinations of standard RGB colors to define a color gradient (Green to Red) for a generalized CPI as its value changes from "1" to "0". The overall loop performance obtained represents a quantitative measure that can be easily rolled up to all higher levels in a control hierarchy.

Although FIG. 2 illustrates one example of a device 200 for implementing a detection system 144 in an industrial control and automation system, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of computing device.

Figure 3:
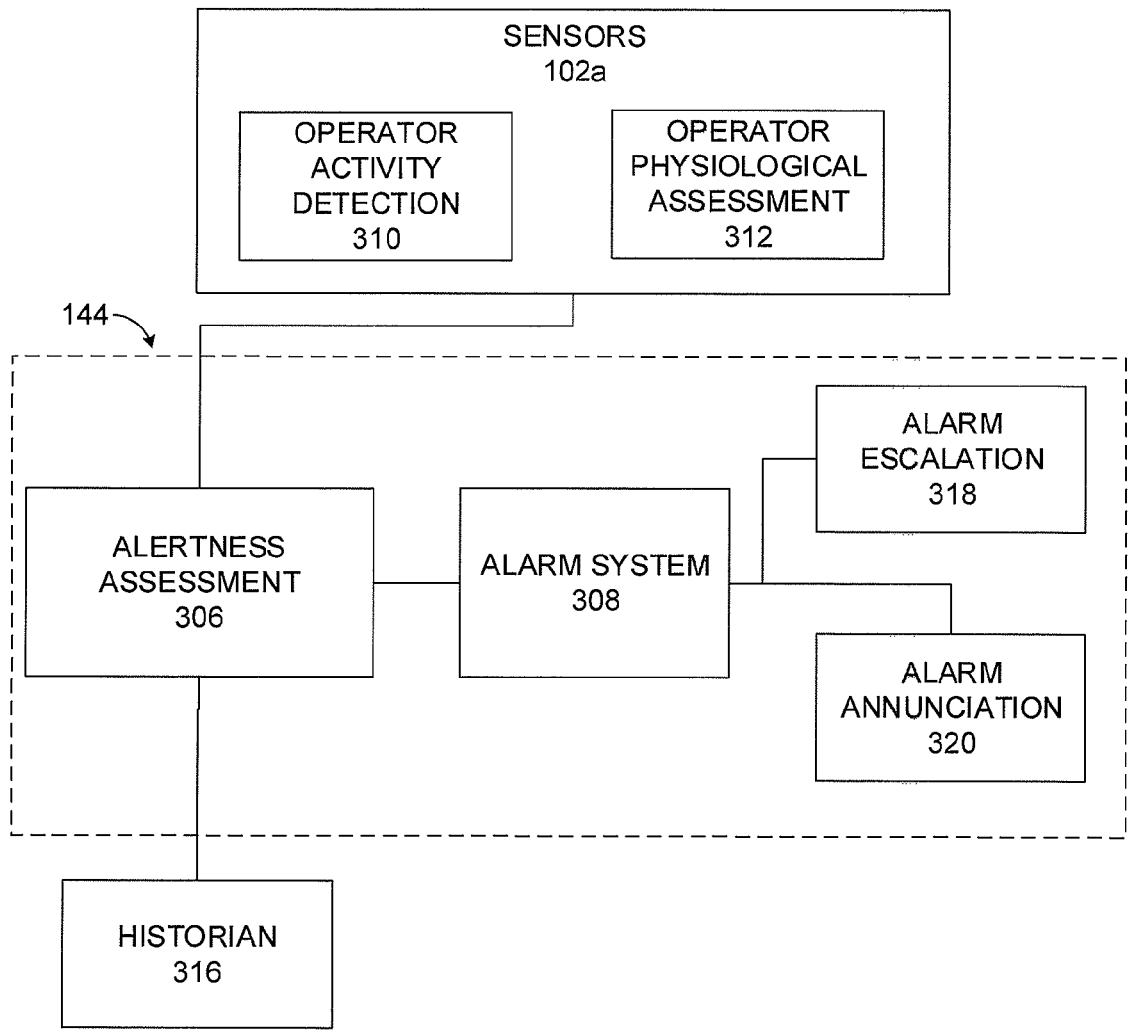
FIG. 3 illustrates an example detection system according to this disclosure.

FIG. 3 illustrates an example detection system 144 according to this disclosure. As shown in FIG. 3, the detection system 144 may include an alertness assessment module 306, an alarm system module 308, an alarm escalation module 318, and an alarm annunciation module 320. The detection system 144 is coupled to a historian 316 (which may represent all or part of the historian 142) and sensors 102*a*. Sensors 102*a* include an operator-activity detection module 310 and an operator physiological assessment module 312.

In an example embodiment, the operator-activity detection module 310 monitors activity of an operator with the system. The operator-activity detection module 310 is used for activity based alertness. Activity based alertness may use a user configurable response time for responding to the alarms depending upon the type of alarm. For example, for urgent alarms there may be a 60 second response time, for high alarms there may be a 300 second response time, and for system alarms there may be a 120 second response time. In different embodiments, other response times can be used for different or the same types of alarms. The operator-activity detection module 310 monitors activity of an operator with respect to responding to these alarms within the time period.

When an alarm occurs, it is useful to know if an operator actually responded to the alarm. Tracking operator actions is an effective way to identify control problems and automation opportunities and audit the effectiveness of the alarm strategy and checking the effective alertness of the user.

In an example embodiment, the operator-physiological assessment module 312 monitors physiological attributes of an operator. The operator-physiological assessment module 312 is used for monitoring physiological based alertness. Physiological based alertness uses wireless EEG sensors for capturing the operator alertness and accordingly logging the event/alert with the historian 316.

The detection system 144 can be added as additional hardware/software components to existing operator consoles/stations and can be integrated into existing operator console hardware as well as HMI software.

The detection system 144 provides a unique hybrid approach based on hardware/software component based alertness as well as process knowledge based alertness and can be in line with EXPERION ORION CONSOLE as well as future human factors development in the area of operator effectiveness and efficient plant operations. In some embodiments, the detection system 144 is user configurable and offers flexibility to the plant operations manager, since different sites can have different shift timings/SOP's to operate the plant.

Embodiments of the detection system 144 improve effectiveness of the operations and analyze trends related to operator fatigue. These embodiments also help in better safety compliance.

In an example embodiment, a user/operator/manager can configure the mouse/screen idle timings via a dedicated operator alert user interface as part of a distributed control system (DCS) configuration studio. For example, a plant operations manager can configure the timings. When the operator allows the mouse/screen to be idle beyond these timings, an automatic event can be generated indicating there was no movement for the configured time. Once idle time is detected, an operator alert event can be generated at the operator station and logged into an event history database.

For example, once one of the assessment methods detects a pre-configured level of activity, the alertness assessment module 306 can calculate a first level of alarm of fatigue or alertness of the operator and generate an alarm into the DCS system. This alarm becomes an event into the system and logged into the historian 316 for future history purposes.

The alarm system 308 can manage the alarm escalation module 318 and the alarm annunciation module 320. The alarm system 308 identifies alarms and can escalate an alarm. The alarm annunciation module 320 can issue an audible or visual alarm to an operator for better and effective operator response.

The alarm escalation module 318 can generate a second level of alarm for a supervisor or other operator. If the operator does not acknowledge the alertness alarm beyond an acceptable duration, a second level of alarm can be generated. This alarm can be configured to be sent to the next level of supervisor considering the urgency of alarm and alertness escalation to next level of supervisor.

Embodiments of the detection system 144 can decrease operator fatigue; increase operator efficiency and effectiveness; help attract and retain operational staff including digital natives; provide effective and efficient process plant operations; help avoid any accidents/emergencies which might arise due to operator fatigue; improve safety; provide better process and operations compliance; and enhance operator effectiveness.

If repeated occurrences of alarms are observed with specific operators or shifts as per history records, management decisions can be made to enhance operator effectiveness, such as medical checkups, operator rotations, and the like.

Although FIG. 3 illustrates one example of an detection system 144, various changes may be made to FIG. 3. For example, various components in FIG. 3 could be combined, further subdivided, or omitted and additional components could be added according to particular needs. Also, the detection system 144 could be coupled to more sensors.

Figure 4:
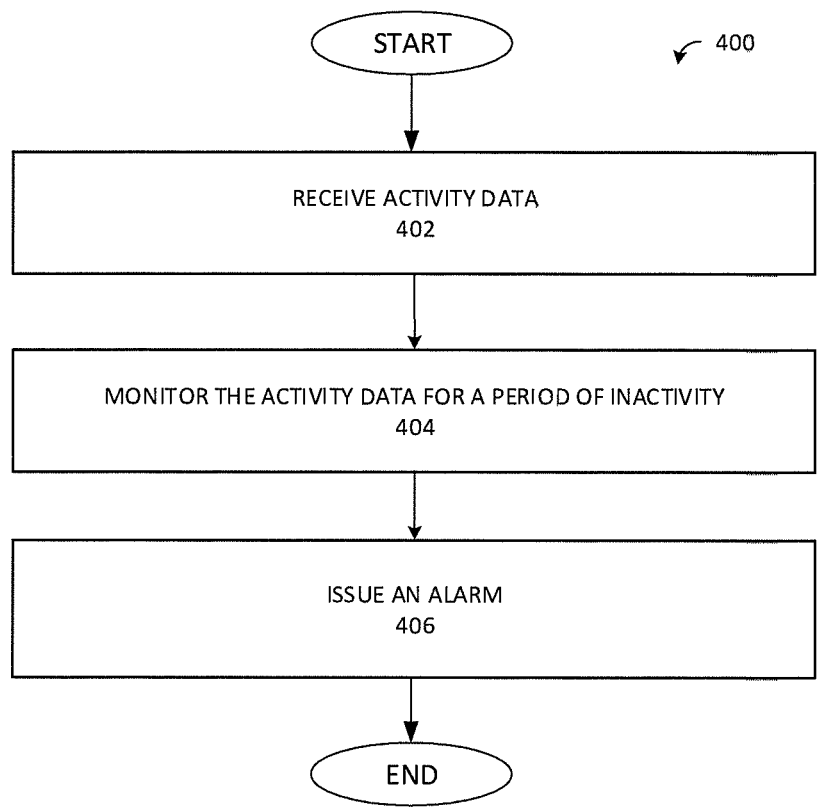
FIG. 4 illustrates an example method for monitoring activity data according to this disclosure.

FIG. 4 illustrates an example method 400 for monitoring activity data according to this disclosure. For ease of explanation, the method 400 is described as being performed with the detection system 144 operating in the system 100 of FIG. 1. However, the method 400 could be used by any suitable device and in any suitable system. A controller and/or processor may operate the detection system 144.

As shown in FIG. 4, at operation 402, a controller receives activity data from a plurality of sensors associated with at least a portion of an industrial process system. If none of the monitored actions is active then it may indicate that an operator is not responding to an alarm.

At operation 404, the controller monitors the activity data for a period of inactivity of all of the plurality of sensors. The sensors may be monitoring for mouse usage, keyboard usage, button activity of a console, and the like. The controller may monitor the activity data in response to an alarm being issued.

At operation 406, the controller, responsive to identifying the period of inactivity, issues an alarm. The period may be manually or dynamically set. The period may be different depending on a type of alarm issued. The alarm can be an audible or visual alert.

The controller may also, responsive to issuing the alarm, monitor the activity data for a second period of inactivity of all of the plurality of sensors. Then, the controller may also, responsive to the second period of inactivity, issue a second alarm.

Although FIG. 4 illustrates one example of a method 400 for monitoring activity data, various changes may be made to FIG. 4. For example, while shown as a series of steps, various steps in FIG. 4 could overlap, occur in parallel, occur in a different order, or occur multiple times.

Figure 5:
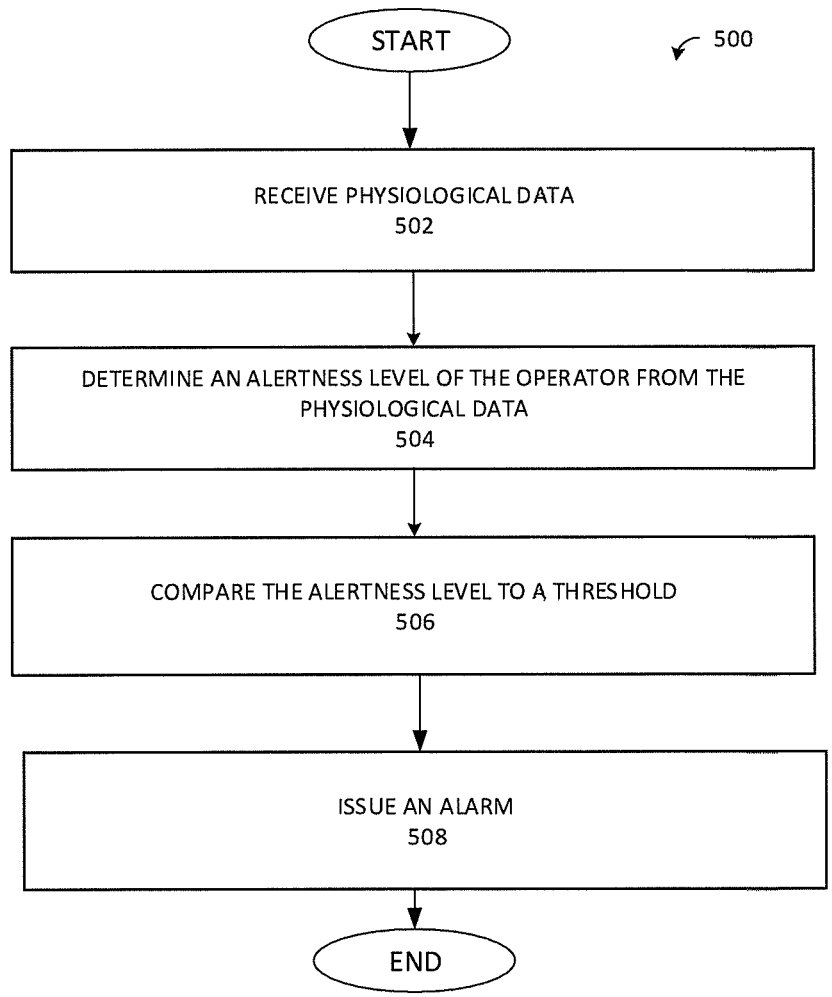
FIG. 5 illustrates an example method for monitoring physiological data according to this disclosure.

FIG. 5 illustrates an example method 500 for monitoring physiological data according to this disclosure. For ease of explanation, the method 500 is described as being performed with the detection system 144 operating in the system 100 of FIG. 1. However, the method 500 could be used by any suitable device and in any suitable system. A controller and/or processor may operate the detection system 144.

As shown in FIG. 5, at operation 502, a controller receives physiological data from the plurality of sensors. The physiological data could include brain activity, posture information, eye tracking information, and the like.

At operation 504, the controller determines an alertness level of the operator from the physiological data. The alertness level may be determined by comparing the physiological data to past behavior of an operator and past physiological data. The alertness level may be determined by comparing physiological data to other data. The comparison can result in an alertness level. For example, if brain activity, when compared to prior brain activity of an operator, indicates that the operator is asleep, then the alertness level may be low. The alertness level could be a status level, such as low, medium, high, and the like. The alertness level can also be a value in a range of values, such as 0-10 and the like.

At operation 506, the controller compares the alertness level to a threshold. The threshold could be a status level, such as low, medium, high, and the like. The threshold can also be a value such as 0-10 and the like.

At operation 508, the controller, responsive to the alertness level exceeding the threshold, issues an alarm. The alarm can be an audible or visual alert.

Although FIG. 5 illustrates one example of a method 500 for monitoring physiological data, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
using at least one processing device:
receiving activity data from a plurality of sensors associated with at least a portion of an industrial process system, wherein the activity data comprises data from a first set of sensors configured to monitor a response to prior alarms and data from a second set of sensors configured to monitor physiology of an operator;
monitoring the activity data to identify a period of inactivity of the first and second sets of the plurality of sensors; and
responsive to identifying the period of inactivity, issuing a first alarm.

2. The method of claim 1, wherein the first alarm is an audible or visual alert.

3. The method of claim 1, further comprising:
responsive to issuing the first alarm, monitoring the activity data to identify a second period of inactivity of the first and second sets of the plurality of sensors; and
responsive to identifying the second period of inactivity, issuing a second alarm.

4. The method of claim 1, further comprising:
receiving physiological data from the second set of sensors;
determining an alertness level of the operator from the physiological data;
comparing the alertness level to a threshold; and
responsive to the alertness level exceeding the threshold, issuing the first alarm.

5. The method of claim 1, further comprising:
identifying the period of inactivity for a previous alarm period.

6. The method of claim 4, wherein the physiological data comprises at least one of brain activity data of the operator, posture data of the operator, and eyelid data of the operator.

7. The method of claim 1, further comprising:
logging the first alarm in a historical database.

8. An apparatus comprising:
at least one memory configured to store activity data from a plurality of sensors associated with at least a portion of an industrial process system, wherein the activity data comprises data from a first set of sensors configured to monitor a response to prior alarms and data from a second set of sensors configured to monitor physiology of an operator; and
at least one processing device configured to:
monitor the activity data to identify a period of inactivity of the first and second sets of the plurality of sensors; and
responsive to identifying the period of inactivity, issue a first alarm.

9. The apparatus of claim 8, wherein the first alarm is an audible or visual alert.

10. The apparatus of claim 8, wherein the at least one processing device is further configured to:
responsive to issuing the first alarm, monitor the activity data to identify a second period of inactivity of the first and second sets of the plurality of sensors; and
responsive to identifying the second period of inactivity, issue a second alarm.

11. The apparatus of claim 8, wherein:
the at least one memory is configured to store physiological data from the second set of sensors; and
the at least one processing device is further configured to:
determine an alertness level of the operator from the physiological data;

compare the alertness level to a threshold; and
responsive to the alertness level exceeding the threshold, issue the first alarm.

12. The apparatus of claim 8, wherein the at least one processing device is further configured to:
identify the period of inactivity for a previous alarm period.

13. The apparatus of claim 11, wherein the physiological data comprises at least one of brain activity data of the operator, posture data of the operator, and eyelid data of the operator.

14. The apparatus of claim 8, wherein the at least one processing device is further configured to:
log the first alarm in a historical database.

15. A non-transitory computer readable medium embodying a computer program, the computer program comprising computer readable program code for:
receiving activity data from a plurality of sensors associated with at least a portion of an industrial process system, wherein the activity data comprises data from a first set of sensors configured to monitor a response to prior alarms and data from a second set of sensors configured to monitor physiology of an operator;
monitoring the activity data to identify a period of inactivity of the first and second sets of the plurality of sensors; and
responsive to identifying the period of inactivity, issuing a first alarm.

16. The non-transitory computer readable medium of claim 15, wherein the first alarm is an audible or visual alert.

17. The non-transitory computer readable medium of claim 15, further comprising computer readable program code for:
responsive to issuing the first alarm, monitoring the activity data to identify a second period of inactivity of the first and second sets of the plurality of sensors; and
responsive to identifying the second period of inactivity, issuing a second alarm.

18. The non-transitory computer readable medium of claim 15, further comprising computer readable program code for:
receiving physiological data from the second set of sensors;
determining an alertness level of the operator from the physiological data;
comparing the alertness level to a threshold; and
responsive to the alertness level exceeding the threshold, issuing the first alarm.

19. The non-transitory computer readable medium of claim 15, further comprising computer readable program code for:
identifying the period of inactivity for a previous alarm period.

20. The non-transitory computer readable medium of claim 18, wherein the physiological data comprises at least one of brain activity data of the operator, posture data of the operator, and eyelid data of the operator.

* * * * *